United States Patent [19]
Akatsuka et al.

[11] Patent Number: 5,156,396
[45] Date of Patent: Oct. 20, 1992

[54] GOLF CLUB SHAFT

[75] Inventors: Tsuneo Akatsuka, Saitama; Yoshihiro Motoki, Misato; Takashi Harada, Soka, all of Japan

[73] Assignee: Somar Corporation, Japan

[21] Appl. No.: 774,823

[22] Filed: Oct. 11, 1991

[30] Foreign Application Priority Data

Aug. 26, 1991 [JP] Japan .................................. 3-238702
Aug. 27, 1991 [JP] Japan .................................. 3-240650

[51] Int. Cl.⁵ ........................................... A63B 53/10
[52] U.S. Cl. ......................... 273/80 B; 273/DIG. 23; 428/36.1; 428/36.3
[58] Field of Search ................. 273/77 R, 80 A, 80 B, 273/80 C, 80 R, DIG. 7, DIG. 23, 67 A, 73 F; 138/130, 132, 137, 144, 124, 125; 43/18.5; 428/36.1, 36.3, 36.9

[56] References Cited

U.S. PATENT DOCUMENTS

| | | | |
|---|---|---|---|
| 2,934,345 | 4/1960 | Scott | 273/DIG. 7 X |
| 3,646,610 | 2/1972 | JAckson | 273/DIG. 7 X |
| 3,896,858 | 7/1975 | Whatley | 138/144 X |
| 3,998,458 | 12/1976 | Inoue et al. | 273/80 R |
| 4,000,896 | 1/1977 | Lauraitis | 273/80 R |
| 4,023,801 | 5/1977 | Van Auken | 273/80 B |
| 4,043,074 | 8/1977 | Airhart | 273/DIG. 23 X |
| 4,084,819 | 4/1978 | Van Auken | 273/80 R |
| 4,097,626 | 6/1978 | Tennent | 273/80 R X |
| 4,131,701 | 12/1978 | Van Auken | 273/DIG. 23 X |
| 4,132,579 | 1/1979 | Van Auken | 273/DIG. 7 X |
| 4,135,035 | 1/1979 | Branen | 273/DIG. 23 X |
| 4,157,181 | 6/1979 | Cecka | 273/80 R |
| 4,214,932 | 7/1980 | Van Auken | 273/DIG. 23 X |
| 4,319,750 | 3/1982 | Roy | 273/80 B |
| 4,404,053 | 9/1983 | Saffire | 273/DIG. 7 X |
| 4,555,112 | 11/1985 | Masghati | 273/80 B X |
| 4,591,155 | 5/1986 | Adachi | 273/DIG. 7 X |
| 4,657,795 | 4/1987 | Foret | 280/281 R X |
| 4,905,734 | 3/1990 | Ito | 138/125 X |
| 5,028,464 | 7/1991 | Shigetoh | 273/80 R X |
| 5,049,422 | 9/1991 | Honma | 273/80 B X |
| 5,071,687 | 12/1991 | Shigetoh | 273/80 R X |
| 5,088,735 | 2/1992 | Shigetoh | 273/80 B |
| 5,093,162 | 3/1992 | Fenton et al. | 273/77 R X |

Primary Examiner—George J. Marlo
Assistant Examiner—Sebastiano Passaniti
Attorney, Agent, or Firm—Lorusso & Loud

[57] ABSTRACT

A light weight, high strength carbon fiber golf culb shaft includes inner, intermediate and outer tubular layers formed of carbon fiber-reinforced plastic. The intermediate layer is formed of high modulus, high strength carbon fibers having a modulus of 35000 kg/mm² or more while the outer layer is formed of high strength carbon fibers having a modulus of 23000–30000 kg/mm². Th carbon fibers of the intermediate and outer layers are oriented at an angle in the range of 0 to 15 degrees with respect to the longitudinal axis of the shaft, while the carbon fibers of the inner layer are oriented at an angle of 30 to 80 degrees. The weight ratio of the intermediate layer to the outer layer ranges from 15:85 to 50:50, and the weight of the inner layer is 30–60 % by weight based on the total weight of the three layers. The shaft has a rigidity of 220–240 cycles per minute in terms of frequency and a weight of 63 g or less in the axial length of 1143 mm from the tip end.

11 Claims, 1 Drawing Sheet

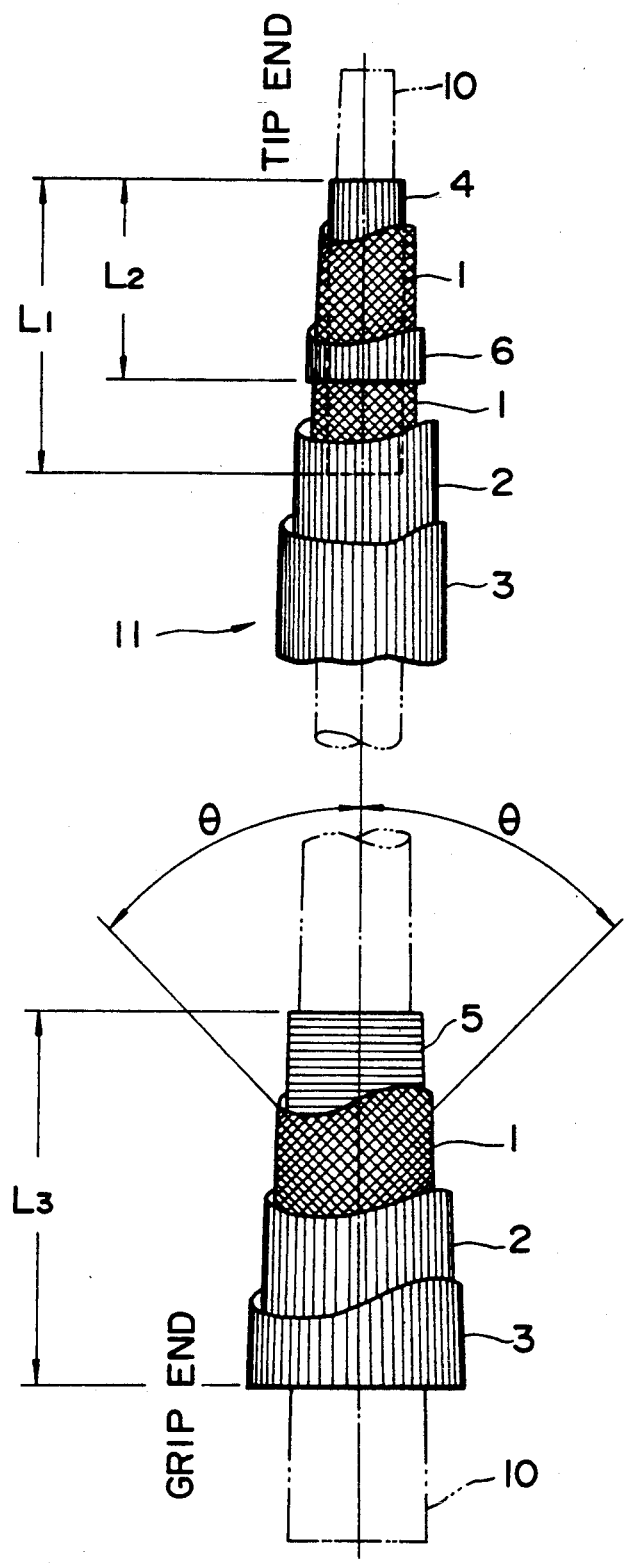

GOLF CLUB SHAFT

BACKGROUND OF THE INVENTION

This invention relates to a golf club shaft formed of a carbon fiber-reinforced plastic (CFRP) and to a golf club using same.

Japanese patent publication (Tokkyo Kokoku) No. 60-39388 discloses a CFRP golf club shaft which is composed of an inner layer formed of a first, carbon fiber-reinforced plastic and containing a first carbon fiber group oriented at an angle in the range of 25 to 65 degrees with respect to the longitudinal axis of the shaft, and an outer tubular layer provided around said inner layer and formed of a second, carbon fiber-reinforced plastic and containing a second carbon fiber group oriented at an angle in the range of 0 to 15 degrees with respect to the longitudinal axis of the shaft.

While such a known club shaft is lighter in weight and provide an improved golf club which can hit a golf ball longer distance as compared with conventional steel club shafts, the flexural rigidity thereof is still insufficient to satisfy the demand of hard hitter players who can swing their clubs with a high club head speed. More specifically, when the known CFRP club is swung, the shaft bends excessively along it longitudinal axis during the top swing and down swing so that the movement of the club head is excessively retarded. Therefore, the player cannot shot the ball with intended swing. Though stiffness can be imparted to the shaft by increasing the thickness of the wall thereof, this causes increase in weight of the shaft.

SUMMARY OF THE INVENTION

The present has been made to solve the problems of the conventional CFRP golf club shaft. In accordance with one aspect of the present invention there is provided a golf club shaft having a grip end and a tip end and comprising:

an inner tubular layer formed of a first carbon fiber-reinforced plastic and extending continuously throughout the length of said shaft, said inner layer containing a first carbon fiber group oriented at an angle in the range of 30 to 80 degrees with respect to the longitudinal axis of said shaft;

an intermediate tubular layer provided around said inner layer throughout the length thereof and formed of a second carbon fiber-reinforced plastic, said intermediate layer containing a second carbon fiber group having a modulus of 35000 kg/mm$^2$ or more and oriented at an angle in the range of 0 to 15 degrees with respect to the longitudinal axis of said shaft; and an outer tubular layer provided contiguously around said intermediate layer throughout the length thereof and formed of a third carbon fiber-reinforced plastic material, said outer layer containing a third carbon fiber group having a modulus of 23000–30000 kg/mm$^2$ and oriented at an angle in the range of 0 to 15 degrees with respect to the longitudinal axis of said shaft, the weight ratio of the second carbon fiber in said being in the range of 15:85 to 50:50, the content of the carbon fibers in each of said inner, intermediate and outer layers being at least 73% by weight, and the weight of said inner layer is 30–60% by weight based on the total weight of said inner layer, intermediate layer and the outer layer.

In another aspect, the present invention provides a golf club using the above club shaft.

One of the features of the present invention resides in the use of two specific layers for the formation of the outer layer of the conventional two-layered CFRP golf club shaft. By this, the shaft can exhibit satisfactory stiffness without undesirable increase in the weight thereof.

BRIEF DESCRIPTION OF THE DRAWINGS

The present invention will now be described in detail below with reference to the accompanying drawing in which the sole FIGURE is a side view, cut away in part, showing the construction and fiber orientation of the layers, in the tip end and grip end portions, of a golf club shaft according to the present invention.

DETAILED DESCRIPTION OF THE PREFERRED EMBODIMENT

Referring to the FIG., designated generally as 11 is one preferred embodiment of golf club shaft according to the present invention. The shaft 11 in this embodiment is illustrated as being wound on a mandrel 10. The shaft 11 has an inner tubular layer 1 formed of a first carbon fiber-reinforced plastic and extending continuously between the tip end and the grip end thereof. The inner layer 1 contains a first carbon fiber group oriented at an angle $\theta$ in the range of 30 to 80 degrees, preferably in the range of 40 to 70 degrees with respect to the longitudinal axis of the shaft 11. Preferably, the inner layer 1 is formed of multi-fold windings in which adjacent two wound layers have the same winding angle with each other but the orientation directions of the windings are opposite to each other (symmetrical) with respect to the longitudinal axis of the shaft as shown in the FIGURE.

The first carbon fiber from which the inner layer 1 is formed is a high strength and/or a high modulus carbon fiber. A carbon fiber having a modulus of 23,000 to 65,000 kg/mm$^2$ is generally used. Illustrative of suitable high modulus carbon fibers are those commercially available under the names of M35J, M40J, M46J, M50J and M55J (products by Toray Kabushiki Kaisha) and HMS-40, HMS-46, HMS-55 and HMS-63 (products of Tohoh Rayon Kabushiki Kaisha). Illustrative of suitable high strength carbon fibers are those commercially available under the names of T700S, T400, T800, M30 and M30S (products by Toray Kabushiki Kaisha) and ST-3, IM-400 and IM-500 (products of Tohoh Rayon Kabushiki Kaisha).

The inner layer 1 generally has a carbon fiber content of at least 73% by weight, preferably 75–77% by weight. In terms of volumetric percentage, the carbon fiber content is generally 65% by volume, preferably 67–70% by volume. The plastic material used as a binder or matrix resin for the first carbon fiber is generally a thermosetting resin such as an epoxy resin or an unsaturated polyester resin. An epoxy resin is preferably used.

Provided around the inner layer 1 is an intermediate tubular layer 2 extending throughout the length the shaft 11 and formed of a second, high modulus carbon fiber-reinforced plastic. Thus, the intermediate layer 2 contains a second carbon fiber group having a modulus of 35000 kg/mm$^2$ or more and oriented at an angle in the range of 0 to 15 degrees with respect to the longitudinal axis of the shaft 11. The second carbon fiber to be used for the intermediate layer 2 preferably has a tensile strength of 400 kg/mm² or more. The high modulus carbon fibers exemplified above are suitably used.

The intermediate layer 2 generally has a carbon fiber content of at least 73% by weight, preferably 75-77% by weight. In terms of volumetric percentage, the carbon fiber content is generally 65% by volume, preferably 67-70% by volume. The plastic material used as a binder or matrix resin for the second carbon fiber is generally a thermosetting resin such as an epoxy resin or an unsaturated polyester resin. An epoxy resin is preferably used.

The intermediate layer 2 is covered with an outer tubular layer 3 provided contiguously around the intermediate layer 2 and formed of a third, high strength carbon fiber-reinforced plastic material. Thus, the outer layer 3 contains a third carbon fiber group having a modulus of 23000-30000 kg/mm² and oriented at an angle in the range of 0 to 15 degrees with respect to the longitudinal axis of the shaft 11. The third carbon fiber to be used for the outer layer 3 preferably has a tensile strength of 400 kg/mm² or more. The high strength carbon fibers exemplified above are suitably used.

The outer layer 3 generally has a carbon fiber content of at least 73% by weight, preferably 75-77% by weight. In terms of volumetric percentage, the carbon fiber content is generally 65% by volume, preferably 67-70% by volume. The plastic material used as a binder or matrix resin for the third carbon fiber is generally a thermosetting resin such as an epoxy resin or an unsaturated polyester resin. An epoxy resin is preferably used.

The weight ratio of the intermediate layer to the outer layer should be in the range of 15:85 to 50:50, preferably 20:80 to 40:60. A weight ratio in excess of 50:50 is undesirable because the mechanical strength of the shaft is lowered. When the weight ratio is smaller than 15:85, on the other hand, the weight of the shaft is undesirably increased.

The weight of the inner layer 1 is 30-60%, preferably 40-50% based on the total weight of the inner layer 1, intermediate layer 2 and outer layer 3. When the proportion of the inner layer 1 exceeds 60% by weight, the weight of the shaft 11 is undesirably increased. On the other hand, too small a proportion of the inner layer below 30% causes reduction of the rigidity and buckling strength of the shaft.

The shaft 11 according to the present invention is preferably provided with reinforcing layers at the tip and grip ends thereof. Such reinforcing layers may be provided inside of the inner layer 1 and/or between the inner and intermediate layers. Referring still to the FIGURE, designated as 4 is a first, tubular, reinforcing layer provided inside of the inner layer 1 and extending from the tip end through a length $L_1$ of 50 to 500 mm, preferably 100-300 mm. The first reinforcing layer 4 is formed of a fourth carbon fiber-reinforced plastic and containing a fourth carbon fiber group oriented at an angle in the range of 0 to 15 degrees, preferably 0 to 5 degrees with respect to the longitudinal axis of the shaft. The high strength carbon fibers exemplified above are suitably used as the fourth carbon fiber. The first reinforcing layer 4 generally has a carbon fiber content of 63-76% by weight, preferably 66-72% by weight. In terms of volumetric percentage, the carbon fiber content is generally 52-70% by volume, preferably 57-63% by volume. The first reinforcing layer 4 serves to improve the bending strength and impact strength of the shaft.

A second, tubular, reinforcing layer 5 is provided inside of said inner layer 1 and extends from the grip end through a length $L_3$ of 100-800 mm, preferably 250-700 mm. The second reinforcing layer 5 is formed of a fifth carbon fiber-reinforced plastic and containing a fifth carbon fiber group oriented at an angle in the range of 80 to 90 degrees, preferably 85 to 90 degrees, with respect to the longitudinal axis of said shaft. The high strength carbon fibers exemplified above are suitably used as the fifth carbon fiber. The second reinforcing layer 5 generally has a carbon fiber content of 63-76% by weight, preferably 66-72% by weight. In terms of volumetric percentage, the carbon fiber content is generally 52-70% by volume, preferably 57-63% by volume. The second reinforcing layer 4 serves to improve the buckling strength of the shaft.

Designated as 6 is a third, tubular, reinforcing layer provided between the inner layer and the intermediate layer and extending from the tip end through a length $L_2$ of 50 to 500 mm, preferably 100-300 mm. The third reinforcing layer 6 is formed of a sixth carbon fiber-reinforced plastic and containing a sixth carbon fiber group. The kind, orientation and content of the sixth carbon fiber of the third reinforcing layer 6 may be the same as those of the first reinforcing layer 4. Although not shown, a reinforcing layer similar to the layer 5 may also be provided between the inner layer 1 and the intermediate layer 2 at the grip end, if desired.

The plastic material used as a binder or matrix resin for the carbon fiber of each of the reinforcing layer is generally a thermosetting resin such as an epoxy resin or an unsaturated polyester resin. An epoxy resin is preferably used.

The proportion of the reinforcing layer or layers in the shaft 11 is generally 25% by weight or less, preferably 10-25% by weight. In other words, the total weight of the inner, intermediate and outer layers 1, 2 and 3 is generally 75-90% by weight, preferably 75-90% by weight, based on the weight of the shaft 11. The total carbon fiber content of the shaft is generally 65% by volume or higher, preferably 65-70% by volume.

The shaft according to the present invention is very light in weight. Generally the weight of the shaft in a length of 1143 mm from the tip end is 63 g or less, preferably 5-63 g. Namely, when the shaft has a length of 1143 mm or more, that portion of the shaft having a length of 1143 mm from the tip end weighs 63 g or less. When the length of the shaft is less than 1143 mm, the weight in a length of 1143 mm (45 inches) is calculated by extrapolation on the basis of a relationship between the weight (Y) and the distance (X) from the tip end of the shaft.

The golf club shaft of this invention is high in stiffness. The stiffness may be expressed in terms of frequency. Thus, the frequency of the shaft according to the present invention is generally in the range of 220-240 CPM (cycle per minute). The method of determining the frequency is described, for example, in U.S. Pat. No. 4,070,022.

The length of the shaft of the present invention is generally 41-46 inches. The tip end of the shaft has an inside diameter of 2-6 mm, preferably 3-4 mm and a wall thickness of 1.2-3.2 mm, preferably 1.7-2.7 mm, while the grip end has an inside diameter of 11.5-14.5 mm, preferably 12.5-13.5 mm and a L. wall thickness of 0.5-2.0 mm, preferably 0.7-1.5 mm.

The shaft 11 may be produced in a manner known per se, such as by a filament winding method, a sheet or tape winding method or a combination of these methods. The torsion angle of the shaft 11 may be controlled in the range of 3-15 degrees by controlling the winding angle, the modulus or the content of the first carbon fibers of the inner layer 1.

Since the shaft of this invention is light in weight and high in stiffness, a head which is heavier than the conventional one can be attached to the tip end of the shaft. For example, in a shaft of a length of 1016-1143 mm, such as a 43 inches No. 1 wood, a head of 195-240 g may be provided to the shaft. The head to be used for the purpose of the present invention is suitably one whose center of gravity is positioned below the horizontal center plane thereof and behind the center vertical plane thereof. The use of a head having an inflated head face is preferable for reasons of improved centering characteristics. For example, it is preferred that the radius of curvature of the head face be 8-9 inches in the case of a No. 1 wood and 10-11 inches in the case of No. 2 and No. 3 woods.

The following examples will further illustrate the present invention.

content of 67.0% and a by volume carbon fiber content of 57.8%.

Sheet Rg to Be Used for Forming Grip-End Reinforcing Layer

High strength, high impact strength carbon fibers (T700S manufactured by Toray K. K.) having a modulus of 23500 kg/mm$^2$, a tensile strength of 500 kg/mm$^2$ and an elongation of 2.1% are unidirectionally oriented to form a sheet. The sheet is impregnated with the above epoxy resin composition to obtain a prepreg sheet having a thickness of 0.10 mm, a by weight carbon fiber content of 67.0% and a by volume carbon fiber content of 57.8%.

Sheets B-1 to B-7 to Be Used for Forming Intermediate Layer and Sheets C-1 to C-7 to Be Used for Forming Outer Layer Unidirectionally oriented carbon fibers shown in Table 1 below are impregnated with the above epoxy resin composition to obtain prepreg sheets having the properties shown in Table 1.

TABLE 1

| | Prepreg Sheet | | | Carbon Fiber | | | |
|---|---|---|---|---|---|---|---|
| No. | Thickness (mm) | Carbon Fiber Content (wt. %) | (vol. %) | Name | Modulus (kg/mm$^2$) | Tensile Strength (kg/mm$^2$) | Elongation (%) |
| B-1 | 0.12 | 76 | 67.5 | M46J | 46000 | 430 | 0.9 |
| C-1 | 0.17 | 76 | 68.9 | M30S | 30000 | 530 | 1.8 |
| B-2 | 0.04 | 76 | 66.8 | HMS55 | 56000 | 400 | 0.7 |
| C-2 | 0.22 | 76 | 68.9 | IM500 | 30000 | 530 | 1.8 |
| B-3 | 0.08 | 76 | 67.8 | HMS46 | 46000 | 500 | 1.1 |
| C-3 | 0.19 | 76 | 68.5 | IM500 | 30000 | 500 | 1.7 |
| B-4 | 0.17 | 76 | 68.4 | M40J | 40000 | 400 | 1.0 |
| C-4 | 0.15 | 76 | 68.5 | IM500 | 30000 | 500 | 1.7 |
| B-5 | 0.22 | 76 | 68.8 | M35J | 35000 | 470 | 1.3 |
| C-5 | 0.13 | 76 | 68.5 | IM500 | 30000 | 500 | 1.7 |
| B-6 | 0.24 | 76 | 68.8 | M35J | 35000 | 470 | 1.3 |
| C-6 | 0.12 | 76 | 68.5 | IM500 | 30000 | 500 | 1.7 |
| B-7 | 0.28 | 76 | 68.8 | M35J | 35000 | 470 | 1.3 |
| C-7 | 0.11 | 76 | 68.5 | IM500 | 30000 | 500 | 1.7 |

EXAMPLE 1

Golf club shafts Nos. 1-10 having a structure as shown in the FIGURE were prepared using the following raw material prepreg sheets:

Sheet A-1 to be Used for Forming Inner Layer

High modulus carbon fibers (M40J manufactured by Toray K. K.) having a modulus of 40000 kg/mm$^2$, a tensile strength of 400 kg/mm$^2$ and an elongation of 1.2% are unidirectionally oriented to form a sheet. The sheet is impregnated with a composition containing a semisolid phenol novolak epoxy resin, a solid bisphenol A epoxy resin, a liquid bisphenol A epoxy resin and a solvent and is partly cured to obtain a prepreg sheet having a thickness of 0.06 mm, a by weight carbon fiber content of 76.0% and a by volume carbon fiber content of 68.4%.

Sheet Rt to Be Used for Forming Tip-End Reinforcing Layer

High strength, high impact strength carbon fibers (T700S manufactured by Toray K. K.) having a modulus of 23500 kg/mm$^2$, a tensile strength of 500 kg/mm$^2$ and an elongation of 2.1% are unidirectionally oriented to form a sheet. The sheet is impregnated with the above epoxy resin composition to obtain a prepreg sheet having a thickness of 0.14 mm, a by weight carbon fiber A stainless steel mandrel having a length of 120 cm and diameters at the smaller diameter and larger diameter ends of 4.3 mm and 13.3 mm, respectively, was coated with a silicone lubricant. The prepreg sheet Rt was then wound on the smaller diameter end portion of the mandrel with the direction of the carbon fiber filament being oriented in parallel with the longitudinal axis of the mandrel (namely, the carbon fibers are oriented at an angle of 0 degree with respect to the axis of the mandrel) to form a fourfold reinforcing layer having a length of 300 mm (from the tip end of the shaft), a thickness of 0.56 mm and a weight (corresponding to the 300 mm length) of 3.0 g.

The prepreg sheet Rg was wound on the larger diameter end portion of the mandrel with the direction of the carbon fiber filament being oriented perpendicularly to the longitudinal axis of the mandrel (namely, the carbon fibers are oriented at an angle of 90 degrees with respect to the axis of the mandrel) to form a onefold reinforcing layer having a length of 500 mm (from the grip end of the shaft), a thickness of 0.1 mm and a weight (corresponding to the 500 mm length) of 4.8 g.

The prepreg sheet A-1 was then wound on the mandrel throughout the length thereof with the direction of the carbon fiber filament being oriented at an angle of 45 degrees with respect to the axis of the mandrel to form an alternately staggered sixfold wound inner layer having a thickness of 0.36 mm and a weight (corresponding to a 1143 mm length) of 20.3 g.

The prepreg sheet Rt was wound on the smaller diameter end portion of the resulting mandrel with the direction of the carbon fiber filament being oriented at an angle of 0 degree with respect to the axis of the mandrel to form a sevenfold reinforcing layer having a length (from the tip end) of 200 mm, a thickness of 0.98 mm and a weight (corresponding to the 200 mm length) of 4.2 g.

Subsequently, the prepreg sheet B-1 was wound around the inner layer-bearing mandrel throughout the length thereof with the direction of the carbon fiber filament being oriented at an angle of 0 degree with respect to the axis of the mandrel to form a onefold intermediate layer having a thickness of 0.12 mm and a weight (corresponding to the 1143 mm length) of 8.0 g.

Finally, the prepreg sheet C-1 was wound around the intermediate layer throughout the length thereof with the direction of the carbon fiber filament being oriented at an angle of 0 degree with respect to the axis of the mandrel to form a twofold outer layer having a thickness of 0.34 mm and a weight (corresponding to the 1143 mm length) of 21.9 g.

The wound shaft structure thus obtained was tightly fixed on the mandrel by winding a synthetic resin tape so as to prevent deformation of the shaft and was heated in an oven to completely cure the wound shaft. After being cooled to room temperature, the mandrel was removed. Both ends of the shaft were cut to leave a shaft with a length of 1143 mm and a weight of 62.2 g. This shaft was sanded to form a golf club shaft No. 3 with a circular cross section. The shaft No. 3 had a length of 1143 mm (45 inches), a tip end outside diameter of 8.5 mm, a tip end inside diameter of 4.35 mm, a grip end outside diameter of 15.1 mm, a tip end inside diameter of 4.35 mm, a grip end outside diameter of 15.1, a grip end inside diameter of 13.3 mm, a weight of 59.3 g, a by weight ratio of the inner layer to the total of the intermediate layer and the outer layer of 43:57 and a proportion of the intermediate layer to the outer layer of 30:70.

The above procedure was repeated in the same manner except that the amounts and kinds of the prepreg sheets for the formation of the intermediate and outer layers were changed as shown in Table 2 to obtain golf club shafts Nos. 1 2, and 4-10.

TABLE 2

| Shaft No. | Intermediate Layer B | Outer Layer C | Weight Ratio of B:C | Total Weight of B and C (g) | Weight of Shaft (g) |
|---|---|---|---|---|---|
| 1* | B-2 | C-2 | 10:90 | 29.6 | 63.4 |
| 2 | B-3 | C-3 | 20:80 | 28.0 | 61.3 |
| 3 | B-1 | C-1 | 30:70 | 26.7 | 59.3 |
| 4 | B-4 | C-4 | 40:60 | 27.3 | 60.1 |
| 5 | B-5 | C-5 | 50:50 | 28.6 | 61.4 |
| 6* | B-6 | C-6 | 55:45 | 28.4 | 61.4 |
| 7* | B-7 | C-7 | 60:40 | 28.2 | 61.2 |
| 8* | C-1 | B-1 | 30:70 | 27.5 | 60.3 |
| 9* | B-5 | B-5 | 100:0 | 24.5 | 57.3 |
| 10* | C-1 | C-1 | 0:100 | 31.3 | 64.1 |

*Comparative

The shafts Nos. 1-10 thus obtained were tested for their mechanical properties. Test methods are as follows:

Torsion Angle

Sample shaft is firmly secured at a position 40 inches 1016 mm) away from the tip end thereof. A torque of 1 ft.lb (13.83 kg.cm) is applied to the fixed shaft at a point 1 inch (25.4 mm) away from the tip end. The torsion angle with respect to the axis of the shaft is measured.

Frequency

Sample shaft is firmly secured at a position 83 mm away from the grip end thereof. A model head weighing 285 g is fixed to the tip end and excited to freely oscillate. The frequency (cycles per minute) is measured using a counter (Precision FM manufactured by Brunswick Inc.).

Three-Point Bending Test

Sample shaft is cut at 200 mm from the tip end thereof. Both end portions of the 200 mm cut sample are firmly secured with a span of 120 mm and a weight is applied at the middle of the cut sample to breakage. The maximum destructive load is measured A maximum load of 100 kg or more is desired.

Bending Destruction Test

Sample shaft is inserted by a length of 38.1 mm (1.5 inches) from the tip end into a head hosel and firmly fixed thereby. A load is applied to the shaft at a position 101.6 mm (4 inches) away from the fixed point to breakage. The maximum destructive load is measured. A maximum load of 35 kg or more is desired.

Izod Impact Strength Test

Sample shaft is cut at 60 mm from the tip end thereof. Both ends of the 60 mm cut sample are firmly secured and an impact is applied at the middle of the cut sample by a hammer to breakage. The maximum impact absorbing energy is measured. A maximum absorbing energy of 100 kg.cm or more is desired.

The test results are summarized in Table 3.

TABLE 3

| Shaft No. | Torsion angle (degree) | Frequency (CPM) | Three Point Bending Destructive Load (kg) | Maximum Bending Destructive Load (kg) | Maximum Impact Destructive (kg · cm) |
|---|---|---|---|---|---|
| 1 | 5.6 | 232 | 117 | 42 | 125 |
| 2 | 5.6 | 232 | 118 | 42 | 124 |
| 3 | 5.6 | 232 | 115 | 40 | 120 |
| 4 | 5.6 | 232 | 113 | 39 | 110 |
| 5 | 5.6 | 232 | 108 | 36 | 102 |
| 6 | 5.6 | 232 | 100 | 34 | 98 |
| 7 | 5.6 | 232 | 97 | 32 | 97 |
| 8 | 5.6 | 232 | 95 | 30 | 95 |
| 9 | 5.6 | 232 | 80 | 25 | 80 |
| 10 | 5.6 | 232 | 120 | 42 | 125 |

As is evident from the results shown in Tables 2 and 3, Shafts Nos. 2-5 are light in weight and exhibit high stiffness and strength. Shafts Nos. 6-9 are not satisfactory with respect to the strength while Shafts Nos. 1 and 10 are unsatisfactory with respect to the weight.

EXAMPLE 2

Golf club shafts Nos. 11-17 having a structure as shown in the FIGURE were prepared in the same manner as that employed for the preparation of Shaft No. 3 of Example 1 except that the following raw material prepreg sheets A-2 to A-5 were used in place of the sheet A-1 and that the winding angles shown in Table 4 were adopted for the formation of inner layer:

Sheets A-2 to be Used for Forming Inner Layer

High modulus carbon fibers (M40J manufactured by Toray K. K.) having a modulus of 40000 kg/mm$^2$, a tensile strength of 400 kg/mm$^2$ and an elongation of 1.0% are unidirectionally oriented to form a sheet. The sheet is impregnated with a composition containing a semisolid phenol novolak epoxy resin, a solid bisphenol A epoxy resin, a liquid bisphenol A epoxy resin and a solvent and is partly cured to obtain a prepreg sheet having a thickness of 0.06 mm, a by weight carbon fiber content of 76.0% and a by volume carbon fiber content of 68.4%.

Sheets A-3 to be Used for Forming Inner Layer

High strength, medium modulus carbon fibers (M30S manufactured by Toray K. K.) having a modulus of 30000 kg/mm$^2$, a tensile strength of 530 kg/mm$^2$ and an elongation of 1.8% are unidirectionally oriented to form a sheet. The sheet is impregnated with the above epoxy resin composition to obtain a prepreg sheet having a thickness of 0.13 mm, a by weight carbon fiber content of 76.0% and a by volume carbon fiber content of

Sheets A-4 to be Used for Forming Inner Layer

High strength carbon fibers (T700S manufactured by Toray K. K.) having a modulus of 23500 kg/mm$^2$, a tensile strength of 500 kg/mm$^2$ and an elongation of 2.1% are unidirectionally oriented to form a sheet. The sheet is impregnated with the above epoxy resin composition to obtain a prepreg sheet having a thickness of 0.13 mm, a by weight carbon fiber content of 76.0% and a by volume carbon fiber content of 68.0%.

Sheets A-5 to be Used for Forming Inner Layer

High modulus carbon fibers (HMS-63 manufactured by Toray K. K.) having a modulus of 61300 kg/mm$^2$, a tensile strength of 410 kg/mm$^2$ and an elongation of 0.7% are unidirectionally oriented to form a sheet. The sheet is impregnated with the above epoxy resin composition to obtain a prepreg sheet having a thickness of 0.06 mm, a by weight carbon fiber content of 76.0% and a by volume carbon fiber content of 66.4%.

The shafts obtained were tested for torsion angle, weight and frequency in the same manner as that in Example 1. The results were as summarized in Table 4.

TABLE 4

| Shaft No. | Inner Layer Prepreg Sheet | Winding Angle (degree) | Weight (g) | Torsion Angle (degree) | Weight of Shaft (g) | Frequency (CPM) |
|---|---|---|---|---|---|---|
| 11 | A-2 | 45 | 20.3 | 5.5 | 59.3 | 232 |
| 12 | A-3 | 45 | 20.7 | 7.5 | 60.2 | 232 |
| 13 | A-4 | 45 | 20.7 | 9.0 | 61.0 | 232 |
| 14 | A-4 | 55 | 20.7 | 10.5 | 61.2 | 232 |
| 15 | A-4 | 70 | 20.7 | 12.7 | 62.1 | 232 |
| 16 | A-4 | 80 | 20.7 | 17.4 | 62.5 | 232 |
| 17 | A-5 | 45 | 20.3 | 3.6 | 59.2 | 232 |

What is claimed is:

1. A golf club shaft having a grip end and a tip end and comprising:

an inner tubular layer formed of a first carbon fiber-reinforced plastic and extending continuously throughout the length of said shaft, said inner layer containing a first carbon fiber group oriented at an angle in the range of 30 to 80 degrees with respect to the longitudinal axis of said shaft;

an intermediate tubular layer provided around said inner layer throughout the length thereof and formed of a second carbon fiber-reinforced plastic, said intermediate layer containing a second carbon fiber group having a modulus of 35000 kg/mm$^2$ or more and oriented at an angle in the range of 0 to 15 degrees with respect to the longitudinal axis of said shaft; and an outer tubular layer provided contiguously around said intermediate layer throughout the length thereof and formed of a third carbon fiber-reinforced plastic material, said outer layer containing a third carbon fiber group having a modulus of 23000-30000 kg/mm$^2$ and oriented at an angle in the range of 0 to 15 degrees with respect to the longitudinal axis of said shaft, the weight ratio of said intermediate layer to said outer layer being in the range of 15:85 to 50:50, the content of the carbon fibers in each of said inner, intermediate and outer layers being at least 73% by weight, and the weight of said inner layer being 30-60% by weight based on the total weight of said inner layer, intermediate layer and the outer layer.

2. A golf club shaft according to claim 1 and having a rigidity of 220-240 cycles per minute in terms of frequency and a weight of 63 g or less in the axial length of 1143 mm from said tip end.

3. A golf club shaft according to claim 1, further comprising a first, tubular, reinforcing layer provided inside of said inner layer and extending from said tip end with a length of 50 to 500 mm, said first reinforcing layer being formed of a fourth, carbon fiber-reinforced plastic and containing a fourth carbon fiber group oriented at an angle in the range of 0 to 15 degrees with respect to the longitudinal inside of said inner layer and extending from said grip end with a length of 100–800 mm, said second reinforcing layer being formed of a fifth, carbon fiber-reinforced plastic and containing a fifth carbon fiber group oriented at an angle in the range of 80 to 90 degrees with respect to the longitudinal axis of said shaft.

4. A golf club shaft according to claim 3, further comprising a third, tubular, reinforcing layer provided between said inner layer and said intermediate layer and extending from said tip end with a length of 50 to 500 mm, said third reinforcing layer being formed of a sixth, carbon fiber-reinforced plastic and containing a sixth carbon fiber group oriented at an angle in the range of 0 to 15 degrees with respect to the longitudinal axis of said shaft.

5. A golf club shaft according to claim 3, further comprising a fourth, tubular, reinforcing layer provided between said inner layer and said intermediate layer and extending from said grip end with a length of 100–800 mm, said fourth reinforcing layer being formed of a seventh, carbon fiber-reinforced plastic and containing a seventh carbon fiber group oriented at an angle in the range of 80 to 90 degrees with respect to the longitudinal axis of said shaft.

6. A gold club shaft according to claim 1, further comprising a head provided at said tip end.

7. A golf club shaft according to claim 6, wherein said shaft has a length of 1016-1143 mm and said head has a weight of 195-240 g.

8. A golf club shaft according to claim 6, wherein said shaft has a rigidity of 220-240 cycles per minute in terms of frequency and a torsion angle of 3-15 degrees.

9. A golf club shaft according to claim 6, wherein said shaft further comprises a first, tubular, reinforcing layer provided inside of said inner layer and extending from said tip end with a length of 50 to 500 mm, said first reinforcing layer being formed of a fourth, carbon fiber-reinforced plastic and containing a fourth carbon fiber group oriented at an angle in the range of 0 to 15 degrees with respect to the longitudinal axis of said shaft, and a second, tubular, reinforcing layer provided inside of said inner layer and extending from said grip end with a length of 100-800 mm, said second reinforcing layer being formed of a fifth, carbon fiber-reinforced plastic and containing a fifth carbon fiber group oriented at an angle in the range of 80 to 90 degrees with respect to the longitudinal axis of said shaft.

10. A golf club shaft according to claim 6, wherein said shaft further comprises a third, tubular, reinforcing layer provided between said inner layer and said intermediate layer and extending from said tip end with a length of 50 to 500 mm, said third reinforcing layer being formed of a sixth, carbon fiber-reinforced plastic and containing a sixth carbon fiber group oriented at an angle in the range of 0 to 15 degrees with respect to the longitudinal axis of said shaft.

11. A golf club shaft according to claim 6, wherein said shaft further comprises a fourth, tubular, reinforcing layer provided between said inner layer and said intermediate layer and extending from said grip end with a length of 100-800 mm, said fourth reinforcing layer being formed of a seventh, carbon fiber-reinforced plastic and containing a seventh carbon fiber group oriented at an angle in the range of 80 to 90 degrees with respect to the longitudinal axis of said shaft.

* * * * *

UNITED STATES PATENT AND TRADEMARK OFFICE
CERTIFICATE OF CORRECTION

PATENT NO. : 5,156,396
DATED : October 20, 1992
INVENTOR(S) : AKATSUKA et al.

It is certified that error appears in the above-identified patent and that said Letters Patent is hereby corrected as shown below:

Col. 1, line 63, before "being" insert --intermediate layer to the third carbon fiber in said outer layer--.

Col. 4, line 45, delete "5-63g." insert --53-63g.--;
      line 65, delete "a L.".

Col 6, line 42, after "steel" delete the semicolon ";".

Col. 7, line 47, delete "1 2," and insert --1, 2--;
      line 68, delete "1016 mm)" and insert --(1016 mm)--.

Col. 8, line 19, after "measured" insert a period --.--.

UNITED STATES PATENT AND TRADEMARK OFFICE
CERTIFICATE OF CORRECTION

PATENT NO. : 5,156,396
DATED : October 20, 1992
INVENTOR(S) : AKATSUKA et al.

It is certified that error appears in the above-identified patent and that said Letters Patent is hereby corrected as shown below:

Col. 9, line 23, after "content of" insert --68.0%.--.

Col. 10, line 38, after "longitudinal" insert --axis of said shaft, and a second, tubular, reinforcing layer provided--;

line 64, delete "gold" insert --golf--.

Signed and Sealed this

First Day of February, 1994

Attest:

BRUCE LEHMAN

Attesting Officer

Commissioner of Patents and Trademarks